2,799,668
NOVEL POLYMERS OF ETHYLENE AND BICYCLO-(2.2.1)-2-HEPTENES

Arthur W. Anderson, Wilmington, Del., Nicholas G. Merckling, deceased, late of New Castle, Del., by Noelle K. Merckling, administratrix, New Hope, Pa., and Paul H. Settlage, Wilmington, Del., assignors to E. I. du Pont de Nemours and Company, Wilmington, Del., a corporation of Delaware No Drawing. Application September 19, 1956, Serial No. 610,872

12 Claims. (Cl. 260—88.1)

This invention relates to novel hydrocarbon polymers, and in particular, to interpolymers of ethylene and bicyclo-(2.2.1)-2-heptenes. This application is a continuation-in-part of our copending application Serial No. 511,778, filed May 27, 1955.

Solid polymers of ethylene are well known in the plastic industry. Solid homopolymers of unsubstituted bicyclo-(2.2.1)-2-heptene have been recently disclosed in copending application Serial No. 453,144 filed August 30, 1954, now U. S. Patent 2,721,189. The interpolymerization of ethylene with bicycloheptenes has given rise to polymeric materials with surprisingly outstanding properties.

It is, therefore, the objective of the present invention to prepare novel solid hydrocarbon polymers. A further objective of this invention is to prepare solid interpolymers from ethylene and bicyclo-(2.2.1)-2-heptenes. Another objective of this invention is to prepare stiff, but tough, fibers and films from interpolymers of ethylene and bicyclo-(2.2.1)-2-heptenes. Other objectives will become apparent hereinafter.

The objects of the present invention are accomplished by the polymerization of ethylene and a bicyclo-(2.2.1)-2-heptene with a polymerization catalyst comprising the product obtained on admixing titanium tetrachloride with a lithium aluminum tetraalkyl. By using this polymerization catalyst it is possible to obtain a wide range of interpolymers of ethylene and a bicyclo-(2.2.1)-2-heptene ranging from interpolymers containing only small quantities of ethylene to interpolymers containing only small quantities of the bicyclo-(2.2.1)-2-heptene. It is further possible to prepare interpolymers of ethylene with more than one bicyclo-(2.2.1)-2-heptene. Although the described polymerization catalyst is preferred in preparing the polymers of the present invention, the preparation of the novel polymers is by no means limited to such a system. The catalyst is believed to be an organometallic complex containing titanium in a reduced valence state; this complex is formed when a titanium salt such as a halide, is reacted with the lithium aluminum tetraalkyl. The activity of titanium in catalyzing the polymerization of olefinic monomers may also be obtained by reacting titanium salts with metal alkyls in general and other strong reducing agents. Metals which have shown activity similar to titanium include zirconium, vanadium, tungsten and molybdenum. Thus various combinations of active metal compounds and strong reducing agents may be employed to prepare the interpolymers of the present invention.

The formation of solid polymers in accordance with this invention in the presence of the catalyst herein disclosed can be carried out under extremely mild conditions, namely at room temperatures and atmospheric pressures. It is, of course, possible to employ moderately high pressures and higher temperatures. The polymerization is generally carried out in the presence of an inert hydrocarbon solvent, such as cyclohexane, benzene, or n-heptane. In polymerizing the monomers of the present invention, the reaction takes place most satisfactorily in the absence of moisture and in the absence of other sources of hydroxyl groups, since these compounds tend to destroy the reactivity of the catalyst. The catalyst may be prepared prior to use in the polymerization, or the catalyst components may be admixed in the presence of the monomers.

The bicyclo-(2.2.1)-2-heptenes employed to prepare the novel interpolymers of the present invention are bicyclo-(2.2.1)-2-heptenes having the following general formula:

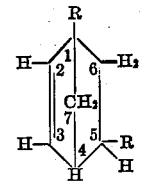

in which R represents a hydrogen or a hydrocarbon radical. The hydrocarbon radical may be an aliphatic radical such as a methyl, ethyl or isopropyl radical or an aromatic radical such as a phenyl group. The bicycloheptenes employed in the present invention include those having more than one substituent, which may be the same or may be different hydrocarbon radicals. Bicycloheptenes having substituents on carbon atoms 2 and 3 are inactive and do not give rise to interpolymers with ethylene. This is quite understandable since substituents on these carbon atoms will, because of their position, interfere and hinder the polymerization of the double bond between carbon atoms 2 and 3. Thus typical substituted bicycloheptene monomers are 1-methyl-bicyclo-(2.2.1)-2-heptene, 5-methyl-bicyclo-(2.2.1)-2-heptene, 5-phenyl-bicyclo-(2.2.1)-2-heptene, 1,5 - dimethyl - bicyclo-(2.2.1)-2-heptene. It should further be noted that monosubstituted bicycloheptenes which are substituted in the 1-position are identical to bicycloheptenes having the same substituent in the 4-position, and similarly bicycloheptenes having substituents in the 6-position are identical to bicycloheptenes substituted in the 5-position, considering the relationship of these groups with respect to the double bond.

The ratio of the monomers in the polymer depends on the ratio of the monomers dissolved in the inert reaction medium. Since ethylene usually has a much faster rate of polymerization, this must be accounted for in the ratio of the monomers added to the polymerization mixture. Highly useful interpolymers were obtained when polymers are prepared containing less than 50 mole percent of a bicyclo-(2.2.1)-2-heptene.

The properties of the interpolymers of the present invention when molded vary with the composition of the interpolymer. Both melting point and stiffness of the interpolymer increase as the bicycloheptene content is increased. Thus melting points of the interpolymer range from below 100° C. at very high ethylene concentrations to above 300° C. at very high concentrations of the bicyclo-(2.2.1)-2-heptene in the interpolymer. Similarly flexible polymers having room temperature stiffness values below $1 \times 10^5$ p. s. i. are obtained at high ethylene concentrations in the interpolymer and stiff polymers having stiffness values of about $3.5 \times 10^5$ p. s. i. are obtained at low ethylene concentrations in the interpolymer. The interpolymers of the present invention are tough over a wide range of monomer ratios; however, at very high bicyclo-(2.2.1)-2-heptene contents, over 70 mol percent, the brittleness of the polymer increases as the bicyclo-(2.2.1)-2-heptene content increases. Outstanding combinations of toughness and stiffness are obtained in interpolymers containing less than 50 mol percent of a bicyclo-(2.2.1)-2-heptene. The interpolymers of ethylene and bicyclo-(2.2.1)-2-heptenes prepared by the methods described herein are high molecular weight polymers which can be drawn into thin films and fibers. Solution viscosity measurement of the interpolymers in 0.1% concentrations in decahydronaphthalene at 150° C. show that the polymers usually have inherent viscosities above 1.0.

The preparation of ethylene is well known in the art and is, for that reason, not described. Bicyclo-(2.2.1)-2-heptenes are conveniently prepared by a Diels-Alder addition reaction employing cyclopentadiene or substituted cyclopentadienes and terminally unsaturated olefins such as ethylene, propylene, butene-1, and higher olefins.

The invention is further illustrated by the following examples in which a preferred method of polymerization is employed.

*Example I*

Into a 1000 cc. 3-neck round bottom flask, equipped with stirrer, gas inlet valve and a dropping funnel, was added under an atmosphere of ethylene $5 \times 10^{-3}$ moles of lithium aluminum tetraheptyl and 20 grams of bicyclo-(2.2.1)-2-heptene dissolved in 50 ml. of cyclohexane. To this was added 0.4 ml. of titanium tetrachloride dissolved in 50 ml. of cyclohexane. The lithium aluminum tetraheptyl was prepared by the addition of n-heptene to lithium aluminum hydride. The temperature was maintained at 25° C. and the pressure of ethylene was maintained at approximately one atmosphere. The polymerization was continued for 1 hour, in which time the ethylene uptake was 5.45 grams. The polymerization was stopped by the addition of 400 ml. of butyl alcohol. The reaction mixture was heated to 80 to 90° C. for a short period to dissolve insoluble catalyst residues. On cooling to room temperature, the precipitated polymer was filtered, washed with methanol and dried. The dried interpolymer of ethylene and bicyclo-(2.2.1)-2-heptene weighed 13.6 gram. A tough, clear film could be molded from the product by heating to 170° C. under a pressure of 20,000 p. s. i. for a period of 2 minutes. The film was found to have a stiffness of greater than 2.5 to $10^5$ p. s. i. as measured by A. S. T. M. film stiffness methods. The density of the interpolymer was .998. The interpolymer could be melt extruded at a temperature of 225° C. In contrast to a mixture of homopolymer of ethylene and a homopolymer of bicyclo-(2.2.1)-2-heptene having the same proportions of ethylene and bicyclo-(2.2.1)-2-heptene and prepared by employing the same catalyst system, the interpolymer of the present invention did not change its physical properties and its infrared spectrum on repeated extractions with an organic solvent. The mixture of the two homopolymers decreased in toughness with each extraction and shifted its infrared spectrum with each extraction.

*Example II*

Employing the equipment described in Example I, 0.4 ml. of titanium tetrachloride dissolved in 50 ml. of cyclohexane and $5 \times 10^{-3}$ moles of lithium aluminum tetraheptyl dissolved in 80 ml. of cyclohexane was added to the flask under nitrogen. The nitrogen was replaced by ethylene at atmospheric pressure, and 20 grams of bicyclo-(2.2.1)-2-heptene dissolved in 50 ml. of cyclohexane was added over a period of 15 to 20 minutes. The polymerization was continued for a period of one hour. The temperature was maintained at 25° C. The uptake of ethylene was 2.65 gram. The reaction mixture was worked up in the same manner as described in Example I. The total weight of the washed, dried interpolymer of ethylene and bicyclo-(2.2.1)-2-heptene was 4 gram. The interpolymer could be molded into tough clear films by pressing at 200° C. under a pressure of 20,000 p. s. i. for a period of 2 minutes. The interpolymer was considerably less stiff than the one prepared in Example I. The interpolymer was found to have a density of .988. The interpolymer of ethylene and bicyclo-(2.2.1)-2-heptene was drawn into fibers by extruding the polymer at a temperature of 170°–200° C. out of a narrow orifice and drawing the hot extrudate. The polymer was found to have an inherent viscosity of 4.34, similar to Example I, the interpolymer did not change its physical properties of its infrared spectrum on repeated extraction with an organic solvent.

*Example III*

Into a 300 ml. continuous glass reactor was charged under nitrogen, 50 ml. of xylene. The nitrogen was then replaced in part by ethylene until the partial pressure of the ethylene was 0.49 atmosphere, while the total pressure was maintained at one atmosphere. A dispersion of the catalyst in xylene was prepared in a separate vessel by admixing a solution of 0.02 mole of lithium aluminum tetraheptyl in 260 ml. of xylene with 0.01 mole of titanium-tetrachloride. This catalyst slurry was continuously added to the reactor, which was maintained at 25° C., over a period of 135 min. Simultaneously 25 ml. of 5-methyl-bicyclo-(2.2.1)-2-heptene was added to the reaction mixture through a separate opening. The reaction vessel was continuously agitated during the polymerization and the ethylene removed from the gas phase was continuously replenished to maintain the same partial pressure. The resulting polymer slurry was removed from the reactor to maintain the volume of the liquid phase at approximately 100 ml. A total of 2490 ml. of ethylene was taken up by the reaction system in the 135 min. of polymerization. The polymer slurry when removed from the reactor was treated with excess butanol to deactivate the catalyst. The polymer was filtered off, washed with methanol, and dried under vacuum at 50° C. A total of 4.5 g. of a white solid polymeric material was obtained. The polymer was identified by infrared spectographic analysis as an interpolymer of 5-methyl-bicyclo-(2.2.1)-2-heptene and ethylene. The interpolymer could be molded into tough, clear films by heating the polymer to 300° C. under pressure. The polymer could be extruded at 290° C. into beading which could be drawn into fibers.

*Example IV*

Employing the procedure described in Example III, 25 ml. of 5-pentyl-bicyclo-(2.2.1)-2-heptene was polymerized with ethylene maintained at a partial pressure of 0.35 atmosphere. The 5-pentyl-bicyclo-(2.2.1)-2-heptene and the solvent containing the catalyst were added over a period of 260 minutes. A total of 1335 ml. of ethylene was taken up by the reaction system. On washing and drying 1.66 g. of a solid polymeric material was obtained. The polymer was identified by infrared spectographic analysis as an interpolymer of ethylene and 5-phenyl-bicyclo-(2.2.1)-2-heptene. The polymer could be molded into tough films by heating to 300° C. under pressure.

*Example V*

Employing the procedure described in Example III, 25 ml. of 5-phenyl-bicyclo-(2.2.1)-2-heptene was polymerized with ethylene maintained at a partial pressure of 0.35 atmosphere. The 5-phenyl-bicyclo-(2.2.1)-2-heptene and the solvent containing the catalyst were added over a period of 130 minutes. A total of 935 ml. of ethylene was taken up by the reaction system. On washing and drying 1.05 g. of a solid polymer was obtained. The polymer was identified by infrared spectrographic analysis as an interpolymer of ethylene and 5-phenyl-bicyclo-(2.2.1)-2-heptene. The polymer could be molded into tough films by heating to 300° C. under pressure.

*Example VI*

Employing the procedure described in Example III, 25 ml. of 1-methyl-bicyclo-(2.2.1)-2-heptene was polymerized with ethylene maintained at a partial pressure of 0.36 atmosphere. The 1-methyl-bicyclo-(2.2.1)-2-heptene and the solvent containing the catalyst were added over a period of 130 minutes. A total of 1920 ml. of ethylene was taken up by the reaction mixture. On washing and drying 1.72 g. of a solid polymeric material was isolated from the reaction mixture. The solid was identified by infrared spectographic analysis as an interpolymer of ethylene and 5-phenyl-bicyclo-(2.2.1)-2-heptene. The polymer could be molded into tough films by heating to 300° C. under pressure.

The interpolymers of the present invention combine high toughness with high stiffness, particularly when made in the range of less than 50 mol percent of bicyclo-(2.2.1)-2-heptene. They may be fabricated into articles, films, and fibers, or employed in casting applications by techniques developed for polymers such as polyethylene and polystyrene. The interpolymers may be blended with other thermoplastic polymers. Fillers and foaming agents may be added to the polymers of the present invention to serve particular applications.

I claim:

1. Normally solid interpolymers of ethylene and a bicyclo-(2.2.1)-2-heptene having the following general formula:

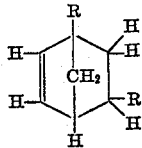

wherein R is a member of the class consisting of hydrogen and hydrocarbon radicals.

2. A normally solid interpolymer of ethylene and a bicyclo-(2.2.1)-2-heptene containing less than 50 mol per cent of the bicyclo-(2.2.1)-2-heptene, said bicyclo-(2.2.1)-2-heptene having the following general formula:

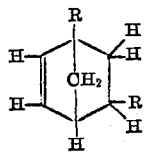

wherein R is a member of the class consisting of hydrogen and hydrocarbon radicals.

3. The interpolymer as set forth in claim 2 wherein the bicyclo-(2.2.1)-2-heptene is 1-methyl-bicyclo-(2.2.1)-heptene.

4. The interpolymer as set forth in claim 2 wherein the bicyclo-(2.2.1)-2-heptene is 5-methyl-bicyclo-(2.2.1)-2-heptene.

5. The interpolymer as set forth in claim 2 wherein the bicyclo-(2.2.1)-2-heptene is 5-pentyl-bicyclo-(2.2.1)-2-heptene.

6. The interpolymer as set forth in claim 2 wherein the bicyclo-(2.2.1)-2-heptene is 5-phenyl-bicyclo-(2.2.1)-2-heptene.

7. The interpolymer as set forth in claim 2 in the form of a film.

8. The interpolymer as set forth in claim 2 in the form of a fiber.

9. A normally solid interpolymer of ethylene and bicyclo-(2.2.1)-2-heptene.

10. A normally solid interpolymer of ethylene and bicyclo-(2.2.1)-2-heptene containing less than 50 mol percent of bicyclo-(2.2.1)-2-heptene.

11. A normally solid interpolymer of ethylene and bicyclo-(2.2.1)-2-heptene containing less than 50 mol percent of bicyclo-(2.2.1)-2-heptene in the form of a clear transparent film.

12. A normally solid interpolymer of ethylene and bicyclo-(2.2.1)-2-heptene containing less than 50 mol percent of bicyclo-(2.2.1)-2-heptene in drawn funicular form.

No references cited.